(12) United States Patent
Nhu

(10) Patent No.: US 8,005,667 B2
(45) Date of Patent: *Aug. 23, 2011

(54) METHODS AND SYSTEMS FOR SAMPLE RATE CONVERSION

(75) Inventor: Hoang Nhu, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 320 days.

This patent is subject to a terminal disclaimer.

(21) Appl. No.: 12/185,638

(22) Filed: Aug. 4, 2008

(65) Prior Publication Data

US 2009/0043571 A1 Feb. 12, 2009

Related U.S. Application Data

(63) Continuation of application No. 10/641,034, filed on Aug. 15, 2003, now Pat. No. 7,409,339.

(51) Int. Cl.
*G10L 19/14* (2006.01)
*G10L 21/00* (2006.01)
*H04B 15/00* (2006.01)

(52) U.S. Cl. .................. 704/211; 381/94.4; 704/206
(58) Field of Classification Search ............ 704/211
See application file for complete search history.

(56) References Cited

U.S. PATENT DOCUMENTS

| 5,471,411 A | 11/1995 | Adams et al. |
| 5,644,677 A | 7/1997 | Park et al. |
| 6,772,022 B1 | 8/2004 | Farrow et al. |
| 7,409,339 B2 | 8/2008 | Nhu |
| 2003/0161486 A1 | 8/2003 | Wu et al. |

OTHER PUBLICATIONS

Sangil Park, "A Real-Time Method for Sample-Rate Conversion from CD to DAT", ICCE 90, IEEE 1990 Conference on Consumer Electronics, Jun. 1990, pp. 360-361.

*Primary Examiner* — Justin W Rider
(74) *Attorney, Agent, or Firm* — Sterne, Kessler, Goldstein & Fox P.L.L.C.

(57) ABSTRACT

Methods and systems for sample rate conversion convert a sampled signal to a higher data rate signal. Conversion pulses are received, having a conversion rate that is higher than the sample rate of the sampled signal. Sample points are then reconstructed from the sampled signal, in real time, on either side of a conversion pulse. An interpolation is performed between the reconstructed sample points, at the time of the conversion pulse. The interpolation results are outputted in real time. The process is repeated for additional conversion pulses. The outputted interpolated amplitudes form the higher data rate signal having a data rate equal to the conversion rate. Sample rate conversion is thus performed in real time according to the higher data rate clock, rather than with fixed ratios. As a result, when the higher data rate clock is affected by, for example, jitter or other frequency variations, the higher data rate samples immediately track the lower data rate samples. This helps to insure that the output higher data rate data tracks the lower rate data, thus providing a more accurate sample rate conversion.

10 Claims, 7 Drawing Sheets

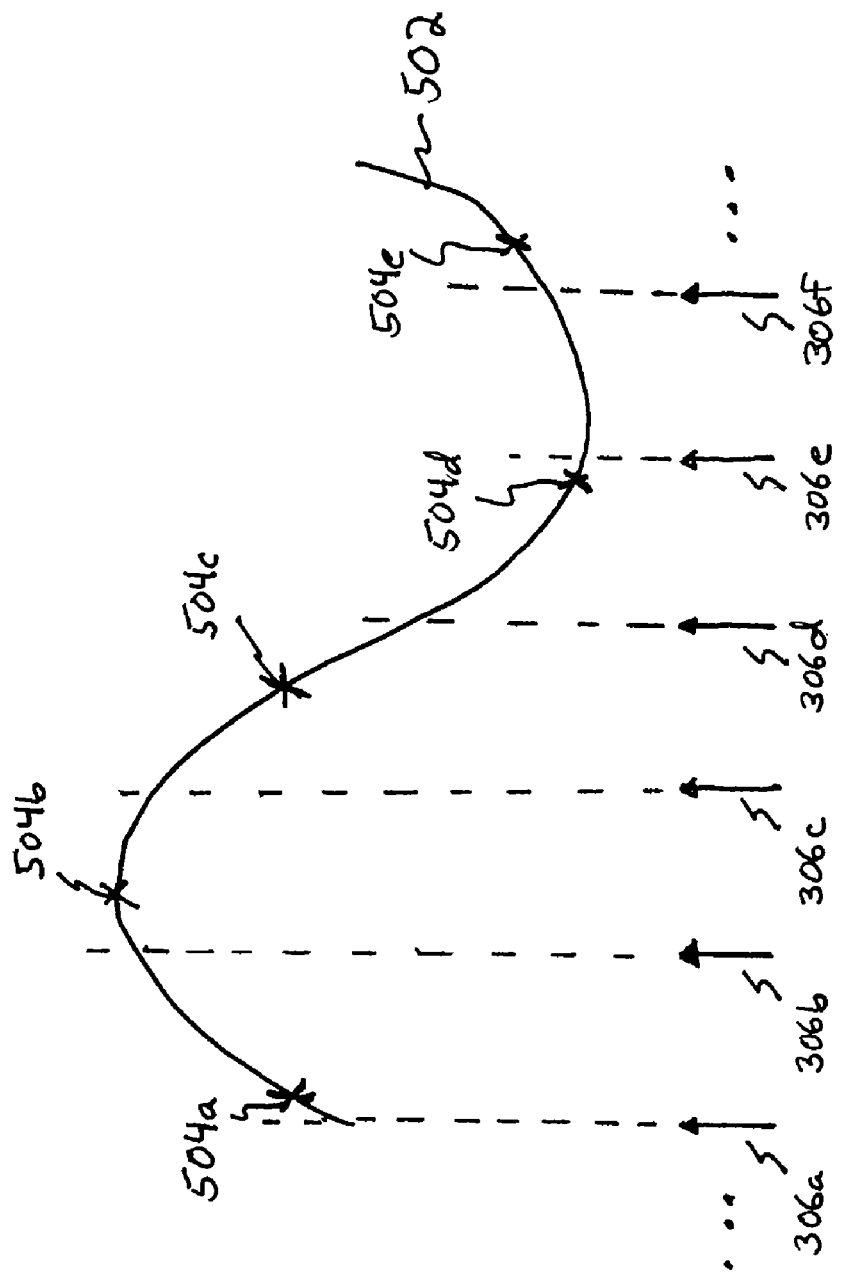

METHODS AND SYSTEMS FOR SAMPLE RATE CONVERSION

CROSS REFERENCE TO RELATED APPLICATIONS

The present application is a continuation of U.S. application Ser. No. 10/641,034, filed Aug. 15, 2003 (now allowed), which is hereby incorporated by reference in its entirety.

BACKGROUND OF THE INVENTION

1. Field of the Invention

The present invention is directed to signal processing and, more particularly, to methods and systems for sample rate conversion.

2. Related Art

In signal processing, sampled signals often need to be converted to higher or lower sample rates. For example, in audio signal processing, an audio signal is sampled at a sample rate. The resulting sampled signal is processed in a digital signal processor ("DSP"). When the DSP operates at a lower rate than the sample rate, the sampled signal is decimated to the lower rate. Decimation is well known in the art.

The DSP output is typically required to be a standardized sample rate. When the standardized sample data rate is higher than the DSP rate, the output data needs to be converted to the higher sample rate. Such a conversion is referred to herein as sample rate conversion.

Conventional sample rate converters suffer from a variety of drawbacks. For example, conventional SRCs typically interpolate between existing sample points to obtain new sample points. The interpolation is typically performed using known, pre-determined, fixed ratios between the lower data rate and the higher data rate. Results are then clocked out at the higher data rate. Such an interpolation is not performed in real time. Thus, when the higher data rate clock is affected by jitter or small/large frequency variations, for example, the higher data rate output does not necessarily track the lower data rate data.

What are needed, therefore, are improved methods and systems for sample rate conversion.

SUMMARY OF THE INVENTION

The present invention is directed to improved methods and systems for sample rate conversion. In accordance with the invention, a sampled signal is converted to a higher data rate signal. Conversion pulses are received, having a conversion rate that is higher than the sample rate of the sampled signal. Sample points are then reconstructed from the sampled signal, in real time, on either side of a conversion pulse. An interpolation is performed between the reconstructed sample points, at the time of the conversion pulse. The interpolation results are outputted in real time. The process is repeated for additional conversion pulses. The outputted interpolated amplitudes form the higher data rate signal having a data rate equal to the conversion rate.

Sample rate conversion is thus performed in real time according to the higher data rate clock, rather than with pre-determined fixed ratios. As a result, when the higher data rate clock is affected by, for example, jitter or other frequency variations, the higher data rate samples are immediately calculated from corresponding lower data rate samples. This helps to insure that the output higher rate data tracks the lower rate data, thus providing a more accurate sample rate conversion.

Additional features and advantages of the invention will be set forth in the description that follows. Yet further features and advantages will be apparent to a person skilled in the art based on the description set forth herein or may be learned by practice of the invention. The advantages of the invention will be realized and attained by the structure particularly pointed out in the written description and claims hereof as well as the appended drawings.

It is to be understood that both the foregoing summary and the following detailed description are exemplary and explanatory and are intended to provide further explanation of the invention as claimed.

BRIEF DESCRIPTION OF THE DRAWINGS/FIGURES

The present invention will be described with reference to the accompanying drawings, wherein like reference numbers indicate identical or functionally similar elements. Also, the leftmost digit(s) of the reference numbers identify the drawings in which the associated elements are first introduced.

FIG. 5A is a timing diagram of an example sampled signal 502, including samples 504.

DETAILED DESCRIPTION OF THE INVENTION

The present invention is directed to improved methods and systems for sample rate conversion. The present invention can be utilized in a variety of signal processing environments. For illustrative purposes, the present invention is described herein in an example video signal processing environment. The invention is not, however, limited to video signal processing. Based on the teachings herein, one skilled in the relevant art(s) will understand that the invention can be implemented in a variety of signal processing environments.

Figure 1:
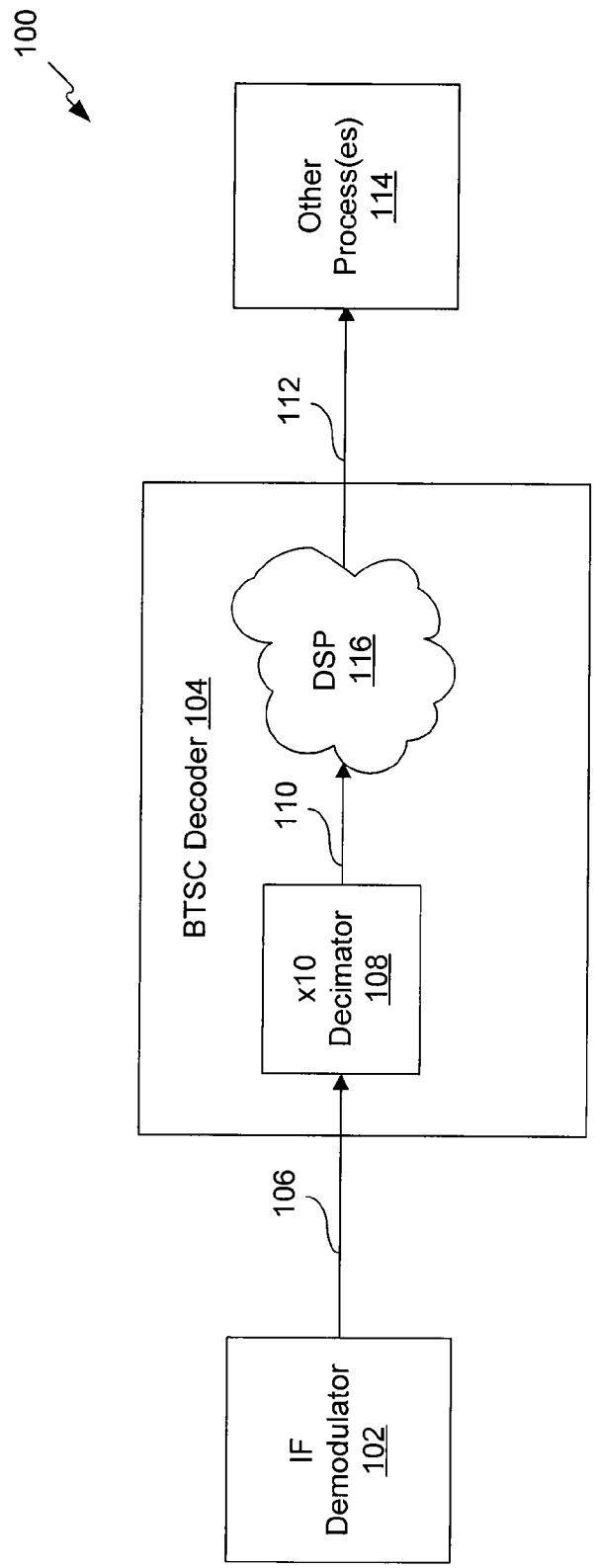
FIG. 1 is a block diagram of an example audio signal processing system 100.

FIG. 1 is a block diagram of an example audio signal processing system 100, including a BTSC intermediate frequency demodulator ("IF demodulator") 102 and a BTSC decoder ("decoder") 104. BTSC is a well known Broadcast Television Systems Committee Standard. IF demodulators and decoders are well known in the relevant arts. IF demodulator 102 outputs digital composite BTSC data ("data") 106. The data 106 has a data rate of, for example, 315.7 kHz. The invention is not, however, limited to this example.

Decoder 104 includes a digital signal processor ("DSP") 116 that typically operates at a data rate that is lower than the data rate of the data 106. Accordingly, the decoder 104 includes a decimator 108 that decimates the data 106 to the DSP data rate. Decimators are well known in the relevant art(s). In the example of FIG. 1, the decimator 108 is illustrated as a X10 decimator that decimates the 317.7 kHz data 106 to a data rate of approximately 31.57 kHz.

The DSP 116 outputs decoded data 112. The decoded data 112 is further processed by one or more subsequent processes 114.

In some situations, the one or more subsequent processes 114, or a subset thereof, operate at a different data rate than the data rate of the decoded data 112. In such a situation, the decoded data 112 is decimated to a lower data rate, and/or converted to one or more higher data rates. When the decoded data 112 is converted to a higher data rate, a sample rate conversion ("SRC") process generates sample points at the higher data rate. This typically requires interpolation between lower data rate samples.

Conventional SRC processes utilize fixed ratios between the lower data rate and the desired higher data rate. Higher data rate samples are calculated from the lower rate samples using the fixed ratios. The resulting higher data rate samples are clocked out using a clock that runs at the higher data rate. Such an interpolation is a real time interpolation. Such conventional SRC processes suffer from a variety of drawbacks. For example, when the higher data rate clock is affected by frequency variations or jitter, for example, the higher data rate output does not necessarily track the lower data rate data. This is because the higher rate clock is used to clock out the predetermined interpolated value. It does not control when the interpolation is performed.

In accordance with the present invention, sample rate conversion is performed in real time according to the higher data rate clock, rather than with fixed ratios. As a result, when the higher data rate clock is affected by, for example, frequency variations or jitter, the higher data rate samples are immediately calculated on corresponding lower data rate samples. This helps to insure that the output higher rate data tracks the lower rate data, thus providing a more accurate sample rate conversion.

Figure 2:
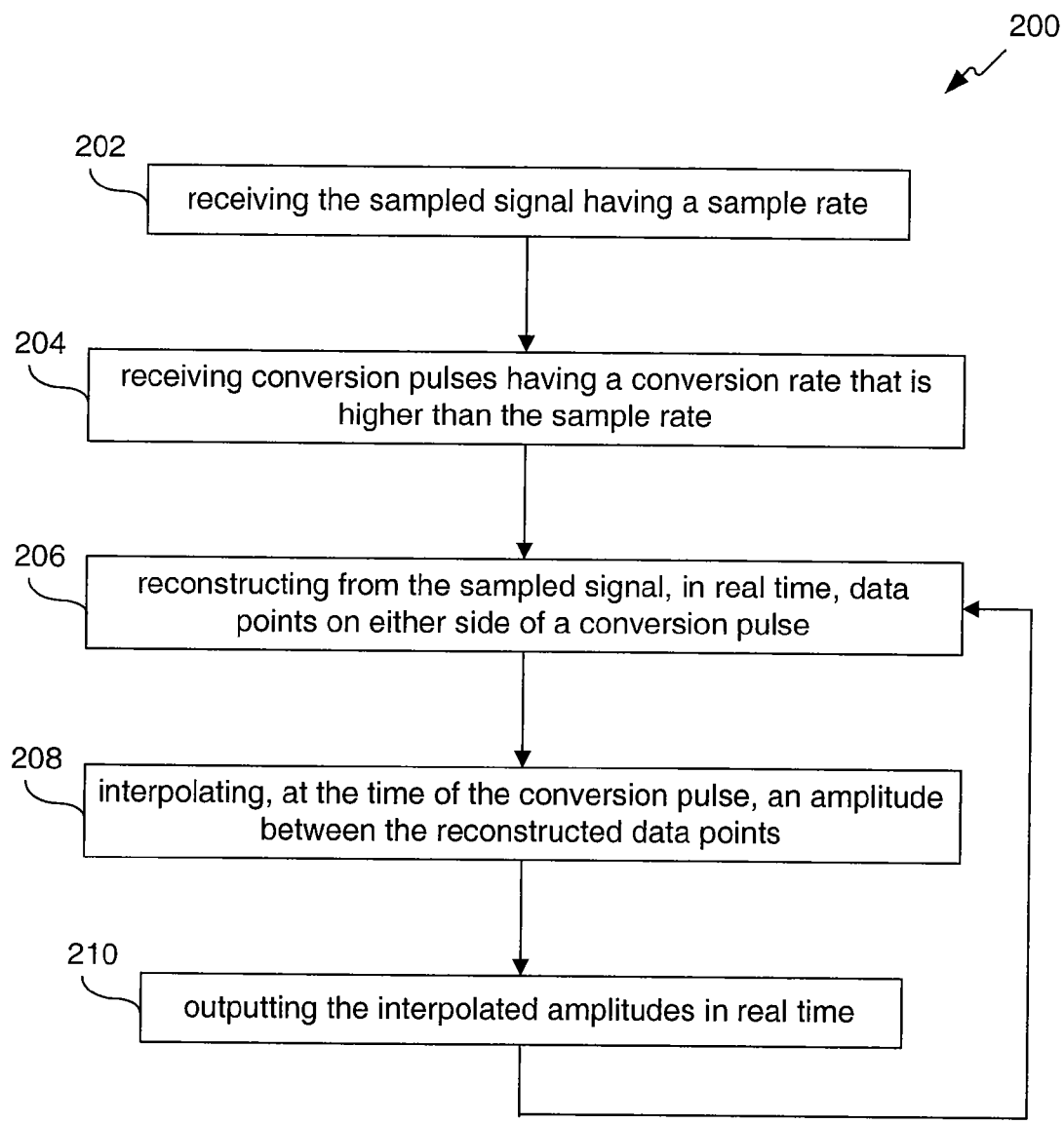
FIG. 2 is an example process flowchart 200 that illustrates an improved sample rate conversion process, in accordance with the present invention.
Figure 3:
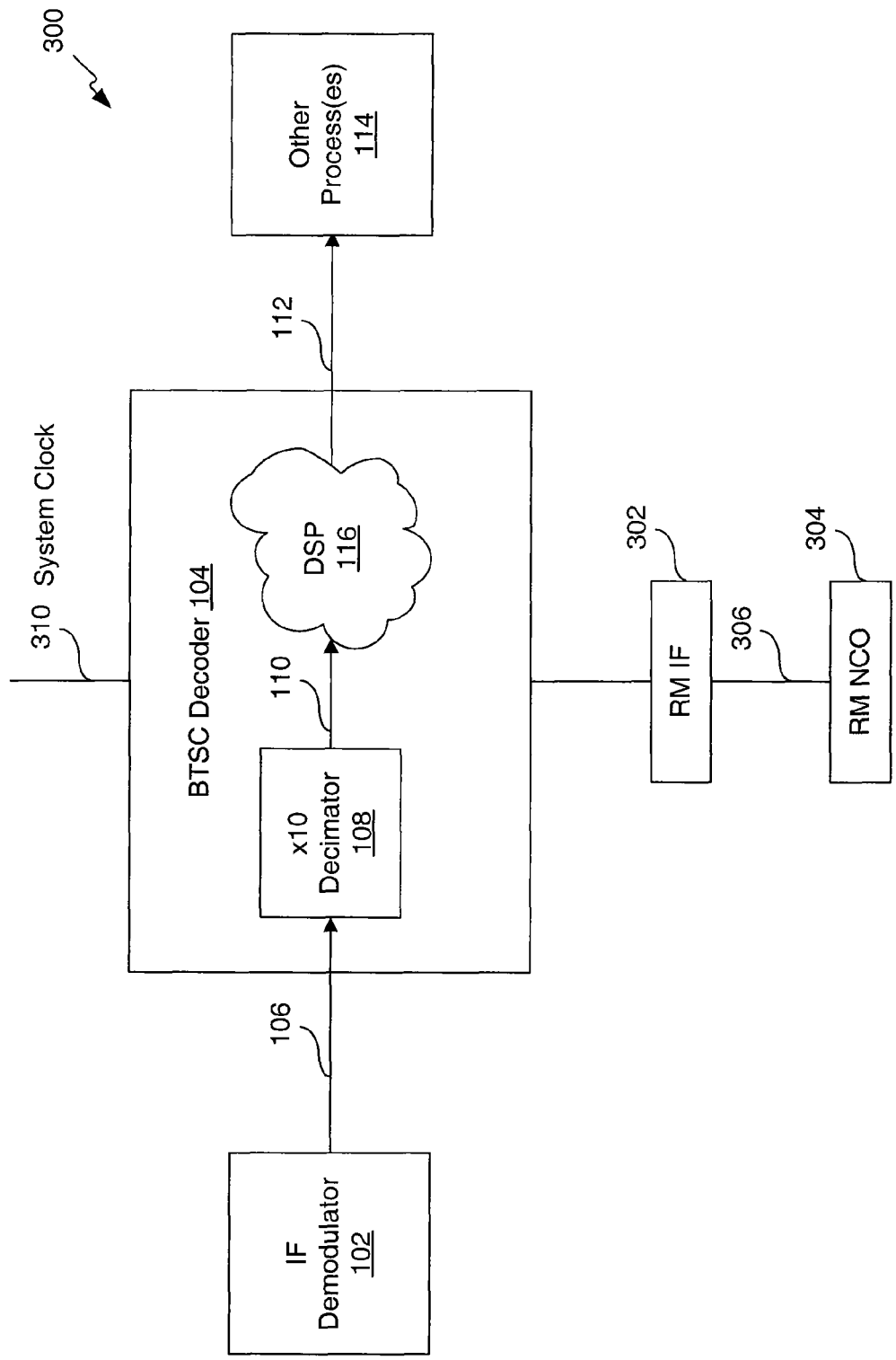
FIG. 3 is a block diagram of the example audio signal processing system 100, further including a rate manager interface and a rate manager numerical control oscillator, in accordance with the present invention.

FIG. 2 is an example process flowchart 200 that illustrates an improved SRC process, in accordance with the present invention. The example process flowchart 200 can be implemented in a variety signal processing environments. For exemplary purposes, the example process flowchart 200 is described below with reference to FIG. 3. FIG. 3 is a block diagram of the example audio signal processing system 100, further including a rate manager interface ("RM IF") unit 302 and a rate manager numerical control oscillator ("RM NCO") 304. The invention is not, however, limited to audio signal processing systems. Operation of the RM IF unit 302 and the RM NCO 304 are described below.

The example process flowchart begins at step 202, which includes receiving sample data. In the example of FIG. 3, decimated data 110 represents the received sample data. However, the received sample data is not necessarily decimated data.

In the example of FIG. 3, the sample data has a data rate of 31.57 kHz. The invention is not, however, limited to this example.

Step 204 includes receiving conversion pulses having a conversion rate that is higher than the sample rate. In the example of FIG. 3, conversion pulses 306 are generated by RM NCO 304. The conversion pulses 306 are provided to the decoder 104 through the RM IF 302. The conversion rate of the conversion pulses 306 are any desired fixed or selectable rate(s). In an embodiment, the conversion rate of the conversion pulses is selectable between 32 kHz, 44.1 kHz, and 48 kHz. The invention is not, however, limited to this example.

Step 206 includes reconstructing, in real time, two sample points on either side of a conversion pulse. Step 206 can include identifying two sets of reconstruction filter coefficients from the conversion pulses received in step 204, as described below with respect to FIG. 4.

Step 208 includes interpolating, at the time of the conversion pulse, an amplitude between the two reconstructed data points. Exemplary methods for interpolating are described below with reference to FIGS. 5 and 6.

Step 210 includes outputting the interpolated amplitude in real time. Steps 206-210 are then repeated for subsequent conversion pulses. The outputted interpolated amplitudes form a higher data rate signal having a data rate equal to the conversion rate.

Figure 4:
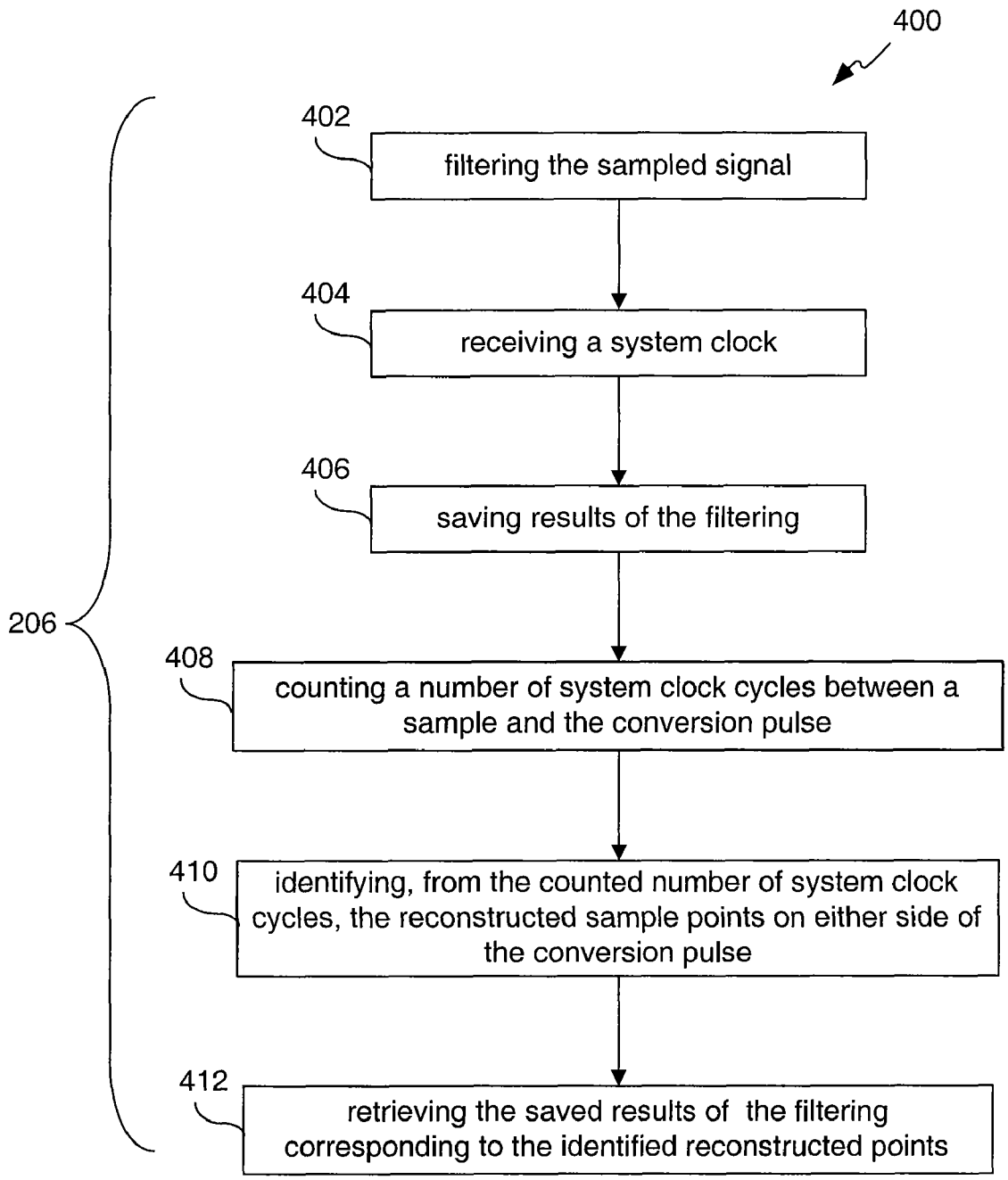
FIG. 4 is an example process flowchart 400 for implementing step 206 from FIG. 2.
Figure 5B:
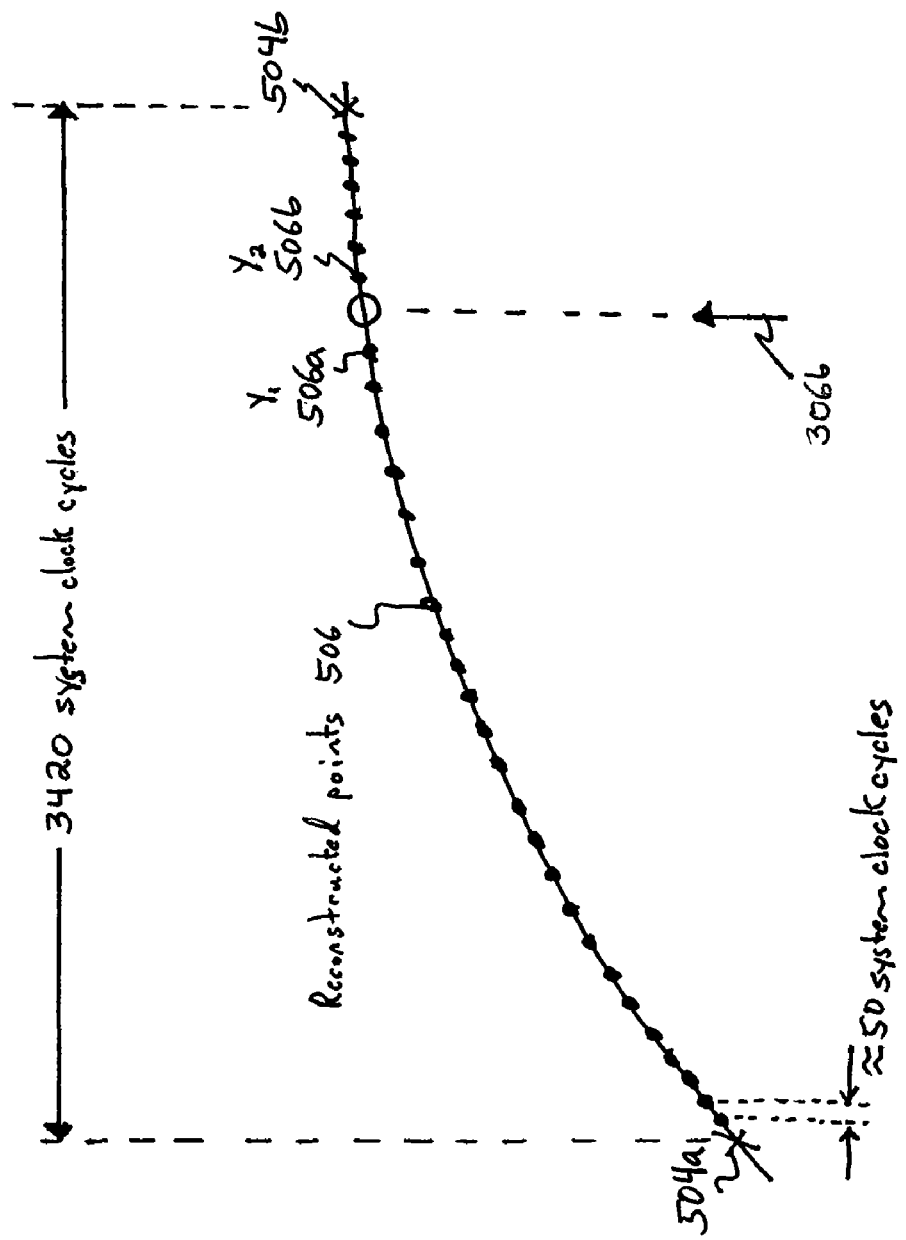
FIG. 5B is an expanded view of a portion of FIG. 5A, centered about a conversion pulse 508b.

Reconstructing step 206 can be implemented in a variety of ways. FIG. 4 is an example process flowchart 400 for implementing step 206. The flowchart 400 is described with respect to FIGS. 5A and 5B. FIG. 5A is a timing diagram of an example signal 502, represented by samples 504. The samples 504 represent samples of signal 112 in FIG. 3. As illustrated in FIG. 5A, conversion pulses 306 occur at a greater frequency than the samples 504. FIG. 5B is an expanded view of a portion of FIG. 5A, centered about a conversion pulse 306*b*. The invention is not, however, limited to the examples of FIGS. 4 and 5.

The flowchart 400 begins with step 402, includes determining the arrival time of the conversion pulse. In an embodiment, this is performed by counting a number of system clock cycles between an original sample and the conversion pulse. In the example of FIG. 3, a system clock 310 is provided to the decoder 104. The system clock 310 has a frequency of, for example, 108 kHz. The invention is not, however, limited to this example. In FIGS. 5A and 5B, system clock cycles are counted from sample 504*a* to conversion pulse 306*b*.

Step 404 includes identifying or determining the two sets of reconstruction filter coefficients (e.g., our of 64 pre-stored filter coefficients) on either side of the conversion pulse. In the example of FIG. 5B, this is represented as coefficients 506*a* and 506*b*, on either side of conversion pulse 306*b*.

The determination of step 404 can be performed using the timing determination from step 402. For example, the 64 filter coefficients are based on dividing the time between the lower data rate samples 504 by 64. In the example of FIG. 5B, for a 108 kHz system clock, there are approximately 3420 system clock cycles between each sample 504. Thus, there are approximately 53 system clock cycles between the two reconstuction points 506*a* and 506*b*.

Step 406 includes computing the two reconstructed points using the 2 sets of coefficients. Step 406 is performed by filtering the sample data 112 using the to sets of reconstruction filter coefficients identified in step 404. The sample data is filtered with, for example, a finite impulse response filter ("FIR"), using any desired number of taps. In an exemplary embodiment, an 18 tap FIR filter is utilized.

Processing them proceeds to step 208, where an interpolation is performed between the two reconstructed points at the time of the conversion pulse 306*b*.

Figure 6:
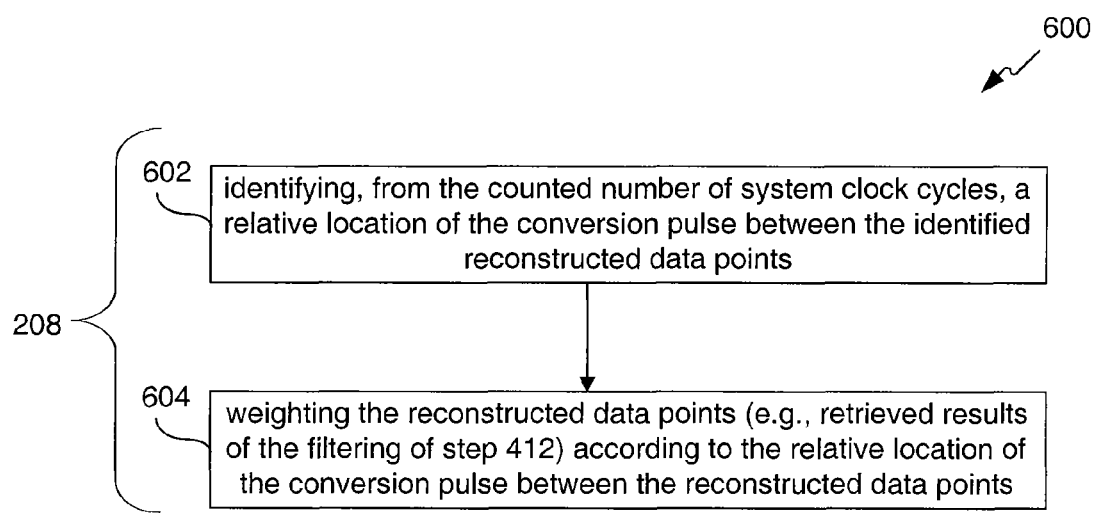
FIG. 6 is an example process flowchart 600 for implementing step 208 from FIG. 2.

Step 208 can be implemented in a variety of ways. FIG. 6 is an example process flowchart 600 for implementing step 208. The flowchart 600 is described with reference to FIGS. 5A and 5B. The invention is not, however, limited to the examples of FIGS. 5 and 6.

The flowchart 600 begins with step 602, which includes identifying, from the counted number of system clock cycles, a relative location of the conversion pulse between the identified reconstructed data points. In the example of FIG. 5B, the number of system clock cycles that occur between the reconstructed sample point 506*a* and the conversion pulse 306*b* are counted.

Step 604 includes weighting the reconstructed data points (e.g., weighting the retrieved results of the filtering of step 412), according to the relative location of the conversion pulse between the two identified reconstructed sample points. For example, recall from above that there are approximately 53 system clock cycles between reconstructed sample point 506a and 506b (FIG. 5B). Suppose, for example, that there are 40 system clock cycles between the reconstructed sample point 506a and the conversion pulse 306b. Then there are approximately 13 system clock cycles between the conversion pulse 306b and the reconstructed sample point 506b. The amplitudes of the reconstructed sample points 506a and 506b are then weighted accordingly (e.g., $\frac{4}{5}*Y1+\frac{1}{5}*Y2$, where Y1 represents reconstructed sample point 506a and Y2 represent reconstructed sample point 506b). Processing then proceeds to step 210, where the interpolated value is output.

In an embodiment, system clock cycles are recorded with a 12 bit counter. Identification of the reconstructed points on either side of the conversion pulse is determined from the 6 most significant bits of the counter. The relative location of the conversion pulse between the two identified reconstructed points is determined from the 6 least significant bits. Based on the teachings herein, one skilled in the relevant art(s) will understand that other formulas can also be used.

CONCLUSIONS

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like and combinations thereof.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An apparatus for converting a sampled signal to a higher data rate signal, comprising:
    an oscillator for generating conversion pulses having a conversion rate that is higher than a sample rate of the sampled signal; and
    a processor to reconstruct from the sampled signal two sample points for each conversion pulse, interpolate between the two reconstructed sample points for each conversion pulse to form interpolated values corresponding to respective conversion pulses, and output the interpolated values, wherein the outputted interpolated values form the higher data rate signal having a data rate equal to the conversion rate.

2. The apparatus of claim 1, wherein the processor reconstructs sample points at the conversion rate from the samples signal and identifies the two reconstructed sample points on either side of the conversion pulse.

3. The apparatus of claim 1, wherein the processor counts a number of system clocks between a sample of the sampled signal and the conversion pulse, identifies reconstruction filter coefficients from the counted number of system clocks, and computes reconstructed sample points using the reconstruction filter coefficients.

4. The apparatus of claim 3, wherein the processor identifies the two reconstructed sample points for each conversion pulse from a set of most significant bits of the counted number of system clocks.

5. The apparatus of claim 3, wherein the processor identifies, from the counted number of system clocks, a relative location of the conversion pulse between the two reconstructed sample points and weights the two reconstructed sample points according to the relative location of the conversion pulse between the two identified reconstructed sample points.

6. The apparatus of claim 5, wherein the processor identifies the relative location of the conversion pulse between the two identified reconstructed sample points, from a set of least significant bits of the counted number of system clocks.

7. The apparatus of claim 3, wherein the counted number of system clocks is represented as a 12 bit number, wherein the 6 most significant bits of the counted number of system clocks are used to identify the two reconstructed sample points for each conversion pulse, and wherein the 6 least significant bits of the counted number of system clocks are used to interpolate between the two identified reconstructed sample points.

8. The apparatus of claim 1, wherein the conversion rate is selectable.

9. The apparatus of claim 1, wherein the sampled signal is a decimated composite BTSC video signal, the decimated sample rate is approximately 31.51 kHz, and the conversion rate is one of 32 kHz, 44.1 kHz, or 48 kHz.

10. The apparatus of claim 9, wherein the conversion rate is selectable between 32 kHz, 44.1 kHz, and 48 kHz.

* * * * *